Aug. 26, 1941.   R. H. LINDHOLM   2,253,794
ENSILAGE CUTTER ATTACHMENT FOR TRACTORS
Filed March 22, 1940   5 Sheets-Sheet 1
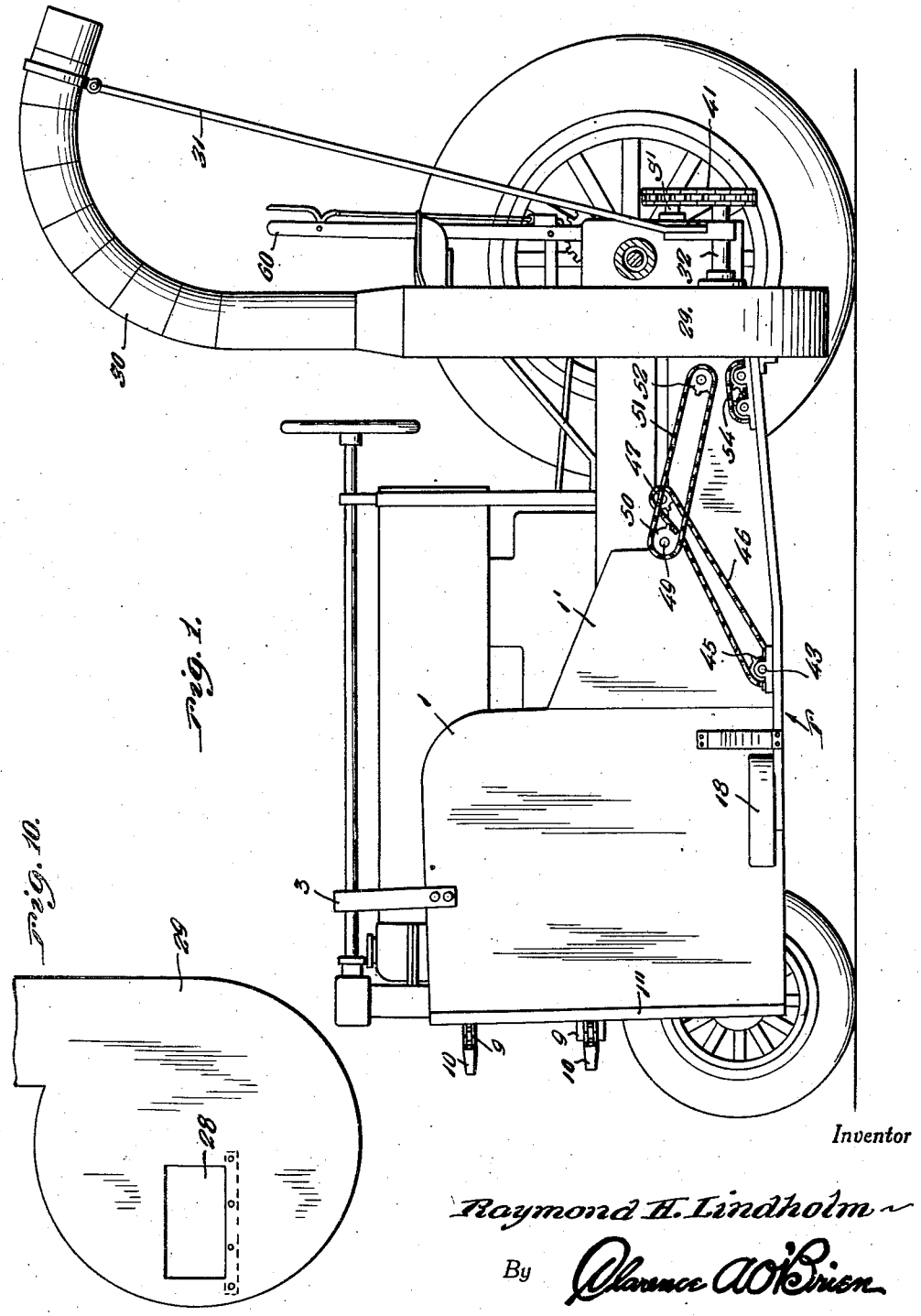
Inventor
Raymond H. Lindholm
By Clarence A. O'Brien
Attorney Aug. 26, 1941.                R. H. LINDHOLM                2,253,794
             ENSILAGE CUTTER ATTACHMENT FOR TRACTORS
                   Filed March 22, 1940          5 Sheets-Sheet 2
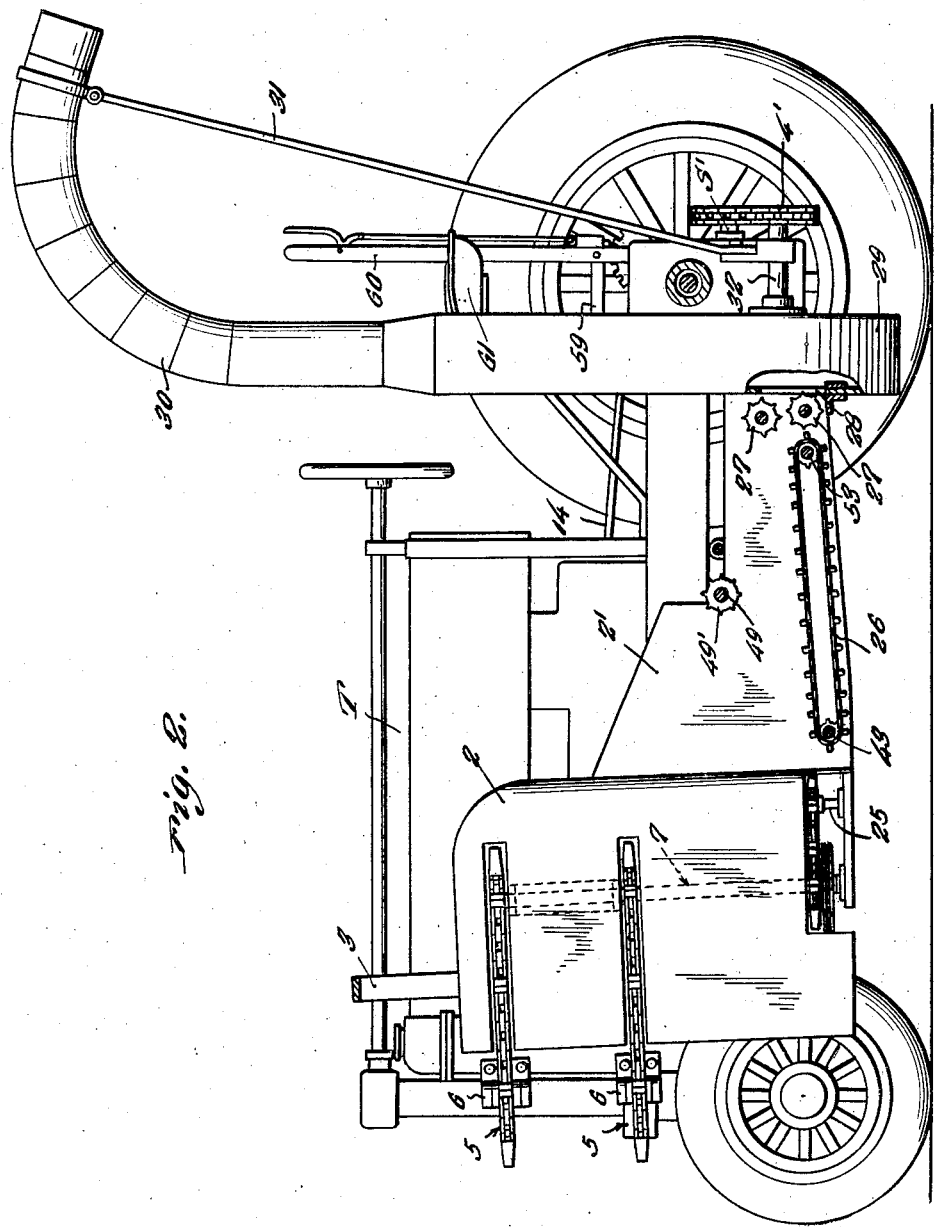
Inventor
Raymond H. Lindholm
By Clarence A. O'Brien
Attorney

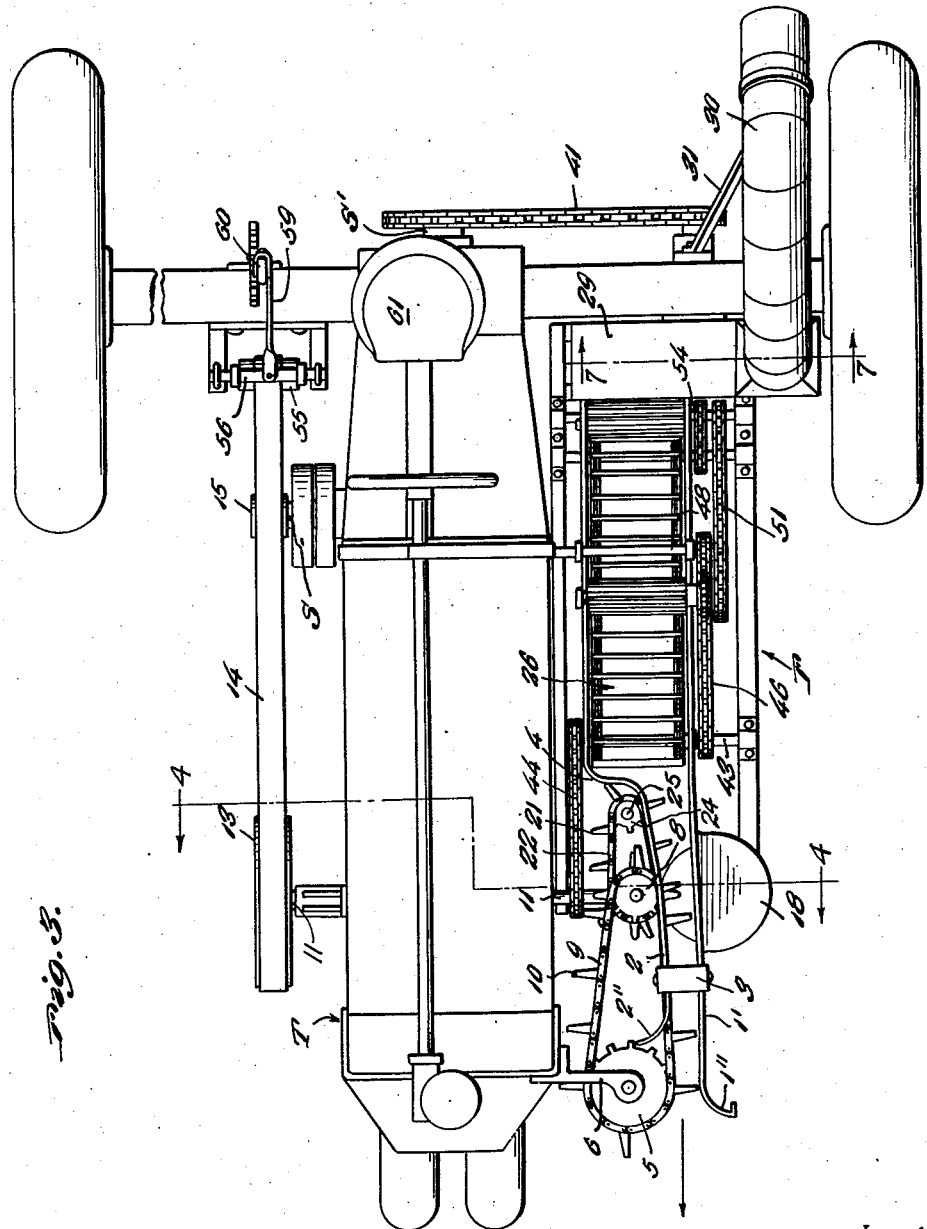

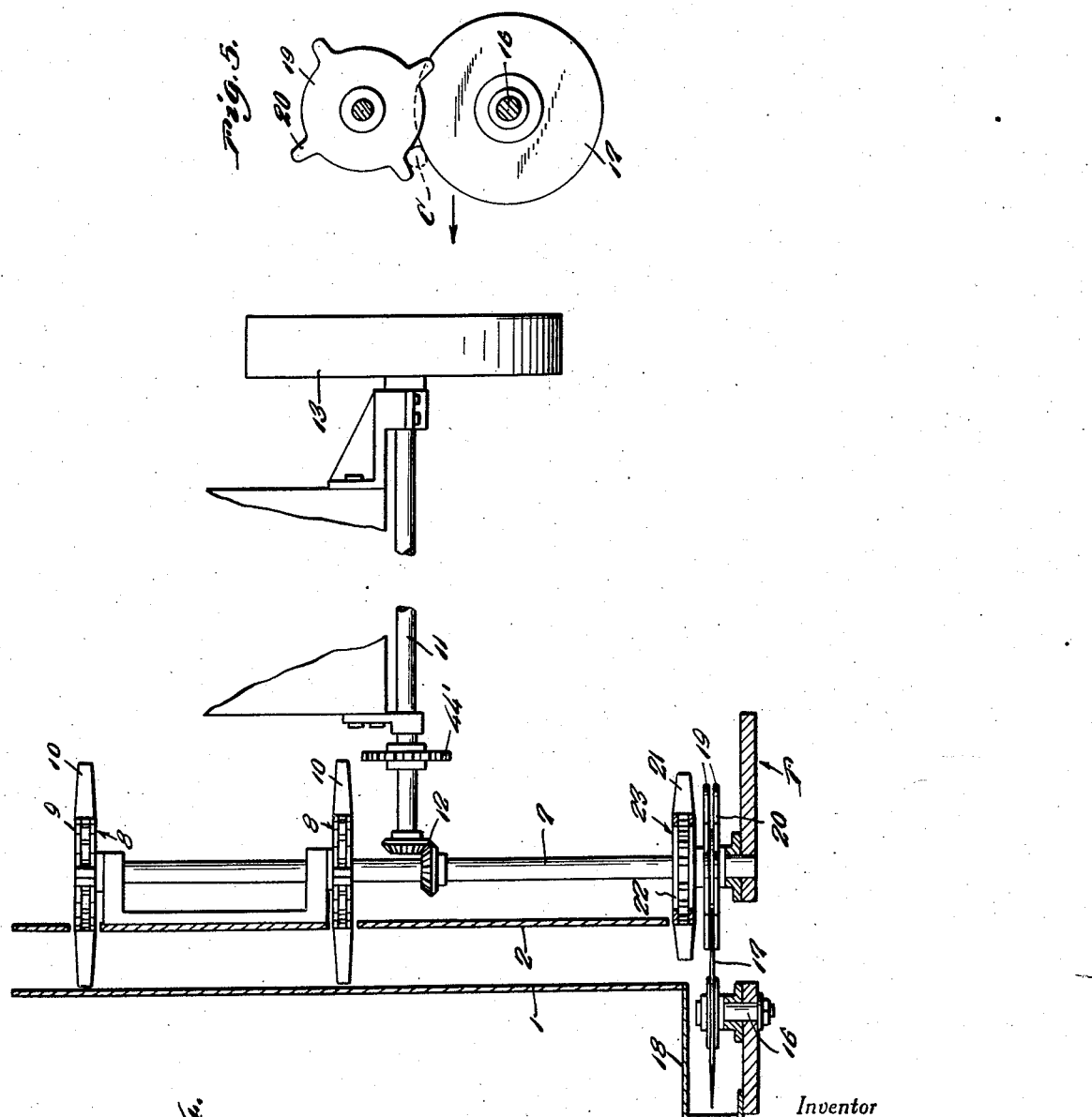

Aug. 26, 1941.  R. H. LINDHOLM  2,253,794
ENSILAGE CUTTER ATTACHMENT FOR TRACTORS
Filed March 22, 1940   5 Sheets-Sheet 5
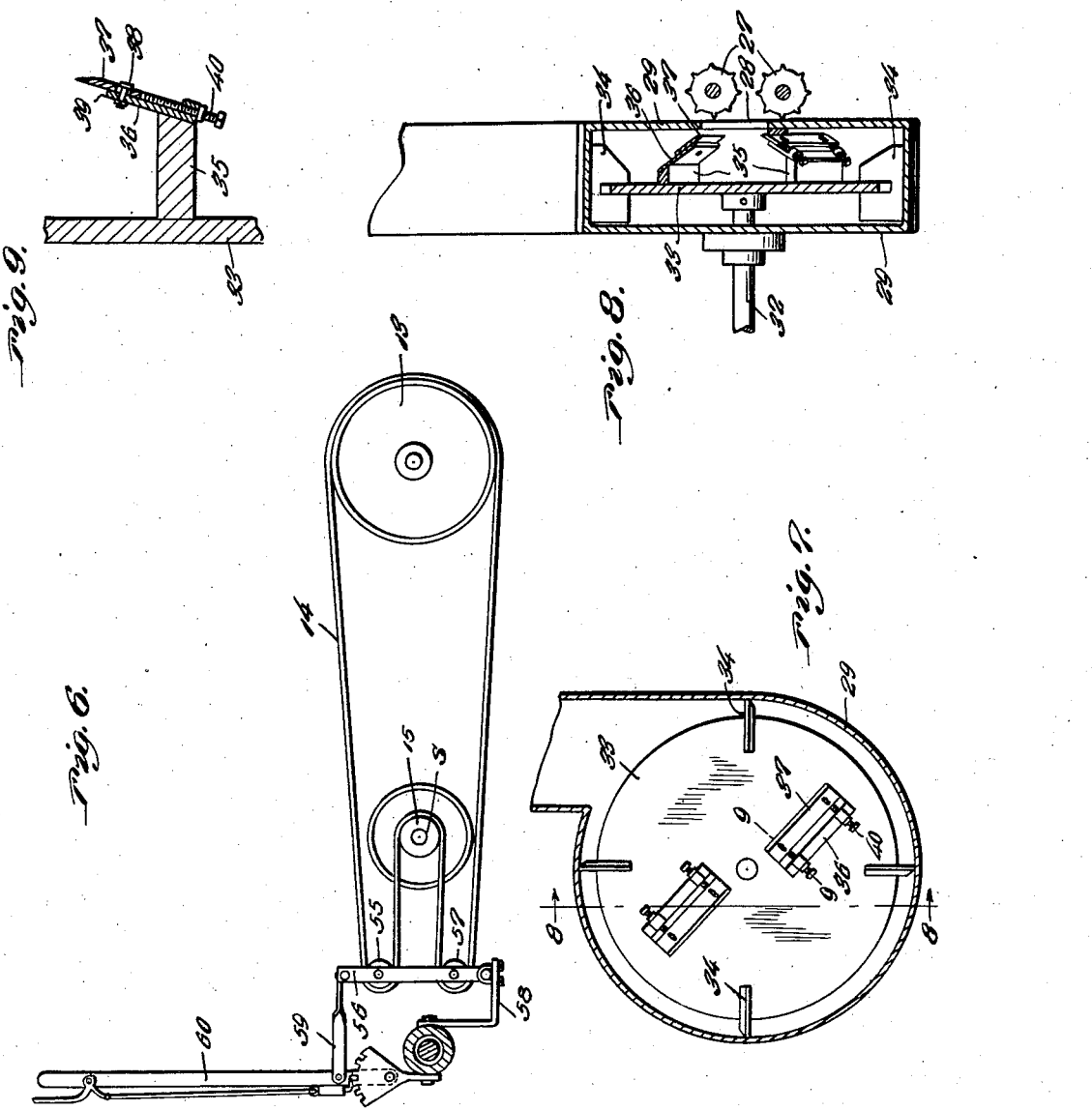
Inventor
*Raymond H. Lindholm*
By *Clarence A. O'Brien*
Attorney Patented Aug. 26, 1941

2,253,794

UNITED STATES PATENT OFFICE 2,253,794

ENSILAGE CUTTER ATTACHMENT FOR TRACTORS

Raymond H. Lindholm, George West, Tex.

Application March 22, 1940, Serial No. 325,457

4 Claims. (Cl. 56—16)

This invention relates to an ensilage cutter attachment for tractors, the general object of the invention being to provide means for cutting the corn or other material and conveying the material to a combined cutter and blower casing where the material is cut into short lengths and blown through a flexible stack into a wagon, truck or the like which follows the tractor.

Another object of the invention is to provide means for operating parts of the device from one part of the tractor and another portion of the device from another part of the tractor so that too much strain is not carried by any one part of the tractor.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is a view looking toward one side of the tractor provided with the invention.

Figure 2 is a similar view but with some of the parts removed and parts shown in section.

Figure 3 is a top plan view of Figure 1.

Figure 4 is a vertical sectional view showing the cutting and feeding means, the section being taken on approximately the line 4—4 of Figure 3 and with parts omitted.

Figure 5 is a plan view of the cutter member and the guard member.

Figure 6 is an elevational view with parts in section showing the belt and pulleys for driving the cutting and feeding means with the manual means for tightening and loosening the belt to make the belt act as clutch means.

Figure 7 is a vertical sectional view through the cutting and blower casing and showing the rotor therein, the section being taken approximately on the line 7—7 of Figure 3.

Figure 8 is a section on the line 8—8 of Figure 7.

Figure 9 is a section on the line 9—9 of Figure 7.

Figure 10 is a front view of the blower and cutter casing showing the inlet opening therein.

In these views the latter T indicates a tractor to which the invention is applied, said tractor being of any suitable type though it is provided with a take-off shaft S at one side thereof and a second take-off shaft S' at its rear.

In carrying out the invention a frame F is attached to that side of the tractor opposite the side from which the take off shaft S projects and this frame supports the vertically arranged outer plate 1 and the vertically arranged inner plate 2 which are spaced apart to form a passageway for receiving the corn stalks or other material to be cut. These plates are connected together at their upper ends by the inverted U-shaped bracket 3 and the outer plate has a longitudinal length which carries it from a point where its front edge is substantially in line with the front of the tractor to a point adjacent the rear of the tractor though the intermediate rear parts of the plate are of less height than the front part as shown at 1' in Figure 1. The inner plate 2 is also of considerable longitudinal length with a low intermediate rear part as shown at 2' in Figure 2. The front edge of the plate 1 is curved outwardly and forwardly as shown at 1" to deflect corn stalks or the like into the passage formed by the plates 1 and 2 and the front edge of plate 2 curves forwardly and inwardly as shown at 2" in Figure 3. The front portions of the two plates are close together so that the passage is narrow but the plates are wider apart at the intermediate and rear portions of the tractor as the inner plate 2 has an intermediate part which extends almost at right angles toward the tractor as shown at 4 in Figure 3.

Upper and lower sprocket wheels 5 are carried by the upper and lower brackets 6 attached to the front part of the tractor and these sprocket wheels are located slightly in advance of the front part of the inner plate 2 and a vertically arranged shaft 7 is supported for rotary movement from a side part of the tractor and the upper portion of the shaft carries the smaller upper and lower sprocket wheels 8 and teeth carrying endless chains 9 pass around the sprockets 5 and 8 with their teeth 10 acting to cause the corn stalks to be directed into the space between the plates 1 and 2 and to pass along the space.

The shaft 7 is driven from a horizontal shaft 11 passing transversely across the tractor and the two shafts are connected together by the beveled gears 12 and said shaft 11 carries the pulley 13 to be driven by a belt 14 passing over a small pulley 15 on the shaft S of the tractor.

A vertically arranged stub shaft 16 is carried by an outer part of the frame F and the upper end of said shaft 16 has attached thereto a disk cutter 17, see Figures 4 and 5, and the lower part of the plate 1 is formed with a casing-like enlargement 18 which covers the cutter 17. The lower part of the shaft 7 carries the spaced disks 19 into the space between which the cutter disk 17 extends and said disks 19 are provided with the fingers 20 which act to cause the stalks of corn C, see Figure 5, to be engaged by the cutter as the stalks are forced through the passage between the plates 1 and 2 by the fingers 10 of the chains 9 and, of course, as the tractor travels along.

After the stalks are cut their butts are engaged by the fingers 21 on a short endless chain 22 passing over a sprocket 23 on the lower part of the shaft 7 above the disks 19 and over a smaller sprocket 24 on a vertically arranged stub shaft 25 supported adjacent the bent part 4 of the inner plate 2, as shown in Figure 3. These fingers 21 carry the stalks upon a conveyor 26 composed of a pair of endless members and cross strips and located in the wide part of the passage formed by the plates 1 and 2 and this conveyor 26 carries the stalks which are now in a substantially horizontal position between the toothed upper and lower rollers 27 which feed the stalks through an inlet opening 28 in a vertically arranged substantially circular casing 29 supported at the rear of the tractor by a part of the frame. A flexible stack or spout 30 extends upwardly from a top part of the casing at one side thereof and this spout is held in adjusted position by means of the link 31 connected to the top of the spout and adjustably connected at its lower end to a part of the tractor, the outlet of the spout or stack extending rearwardly so that it will discharge the cut material into a wagon or truck following the tractor. A shaft 32 extends through the rear wall of the casing 29 and within the casing it is attached to a disk 33 which carries on its periphery the fan blades 34 and at the front of the disk it is provided with the supporting members 35 to which the plates 36 are attached and each plate carries a knife 37 by means of bolts 38 passing through slots 39 in the blade or knife. Each plate 36 also carries screws 40 which can be adjusted to adjust the blade or knife on the plate so that the knives or blades can be adjusted to cut the corn stalks or other matter in the desired lengths.

The shaft 32 is connected by the chain and sprockets shown generally at 41 with the shaft S' at the rear of the tractor.

The front shaft 43 of the conveyor 26 is driven by chain and sprocket means shown generally at 44 from the shaft 11, the sprocket on the shaft 11 being shown at 44'. A sprocket 45 on the front shaft 43 of the conveyor 26 has a chain 46 passing thereover which also passes over a sprocket 47 on a shaft 48 supported in any suitable manner from the upper edges of the plates 1 and 2 at the rear thereof and this chain engages a sprocket on a suitably supported shaft 49 which has a second sprocket 50 thereon over which a chain 51 passes and this chain also passes over a sprocket 52 connected with the shaft of the upper roller 27. The lower roller 27 is rotated from the rear shaft 53 of the conveyor 26 by the chain and sprocket means shown generally at 54 in Figures 1 and 3.

As shown in Figure 6 the belt 14 before passing over the small pulley 15 on shaft S passes first over a small roller or pulley 55 on a lever 56 which is placed rearwardly of the shaft S and then the belt passes around the pulley 15 and then it passes rearwardly over a lower roller or pulley 57 on the lever 56. This lever is pivoted at its lower end to a bracket 58 attached to a part of the tractor and a link 59 connects the top of the lever to a hand lever 60 pivoted to a part of the tractor and arranged adjacent the driver's seat 61 of the tractor. Thus the driver or operator of the tractor can by manipulating the lever 60 adjust the lever 56 to tighten and loosen the belt 14 on the pulley 15 so that these parts act as clutch means for driving the large pulley 13 on shaft 11 from the take-off shaft S.

From the foregoing it will be seen that as the tractor travels along the corn stalks are caused to pass into the space formed by the front ends of the plates 1 and 2 with the stalks being forced through the space by the teeth 10 of the chains 9. The stalks are then cut by the cutting disk 17 which cooperates with the disks 19 and the fingers 20 thereon and then the stalks fall upon the conveyor 26 which carries them to the feeding rolls 27 where the stalks enter the casing 29 through the opening 28 and in this casing the stalks are cut into small lengths as they enter the casing and the air created by the fan blades forces the cut particles through the stack or chute 30 into the wagon, truck or the like following the tractor. Thus the corn is cut and then cut into small pieces to make the ensilage so that the ensilage can be carried directly to a silo.

In some cases a corrugated roller 49' may be attached to the shaft 49, as shown in Figure 2, to facilitate the feeding of the cut material on the conveyor 26.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In an ensilage cutter attachment for a tractor provided with two take-off shafts, such attachment including gathering means, cutting means, conveying means and chopping means, means for actuating the gathering means, cutting means and conveying means from one take-off shaft and means for actuating the chopping means from the second take-off shaft.

2. An ensilage cutter attachment for a tractor comprising a horizontal frame at one side of the tractor and supported from the tractor, a pair of vertically arranged plates rising from the frame, the outer plate being substantially straight and extending longitudinally of the tractor with its front end curving outwardly, the inner plate having its front portion spaced from the front portion of the outer plate with its front end curving inwardly and spaced rearwardly of the plane of the front end of the outer plate, an intermediate portion of the inner plate extending substantially transversely toward the tractor with the rear portion of the inner plate paralleling the rear portion of the outer plate and spaced a considerable distance therefrom to form a space for conveying means, upper and lower sprockets supported from the tractor and located in front of the front end of the inner plate, a vertically arranged shaft supported from the frame and placed between the inner plate and the tractor, sprockets on said shaft, endless chains passing over the sprockets of the two sets and having outwardly extending fingers thereon, the inner plate having longitudinally extending slots in its front portion through which the fingers pass and means for rotating the shaft from a part of the tractor.

3. An ensilage cutter attachment for a tractor comprising a horizontal frame at one side of the tractor and supported from the tractor, a pair of vertically arranged plates rising from the frame, the outer plate being substantially straight and extending longitudinally of the tractor with its front end curving outwardly, the inner plate having its front portion spaced from the front portion of the outer plate with its front end curving inwardly and spaced rearwardly of the plane of the front end of the outer plate, an intermediate portion of the inner plate extending substantially transversely toward the tractor with the rear portion of the inner plate paralleling the rear portion of the outer plate and spaced a considerable distance therefrom to form a space for conveying means, upper and lower sprockets supported from the tractor and located in front of the front end of the inner plate, a vertically arranged shaft supported from the frame and placed between the inner plate and the tractor, sprockets on said shaft, endless chains passing over the sprockets of the two sets and having outwardly extending fingers thereon, the inner plate having longitudinally extending slots in its front portion through which the fingers pass and means for rotating the shaft from a part of the tractor, a vertically arranged stub shaft supported from the frame in rear of the first-mentioned shaft, a sprocket on the stub shaft, a sprocket on the lower part of the first-mentioned shaft, an endless chain passing over the last-mentioned sprocket, said stub shaft being located in front of the transverse part of the inner plate and fingers carried by the last-mentioned chain and passing through an opening in the lower edge of the inner plate.

4. An ensilage cutter attachment for a tractor comprising a horizontal frame at one side of the tractor and supported from the tractor, a pair of vertically arranged plates rising from the frame, the outer plate being substantially straight and extending longitudinally of the tractor with its front end curving outwardly, the inner plate having its front portion spaced from the front portion of the outer plate with its front end curving inwardly and spaced rearwardly of the plane of the front end of the outer plate, an intermediate portion of the inner plate extending substantially transversely toward the tractor with the rear portion of the inner plate paralleling the rear portion of the outer plate and spaced a considerable distance therefrom to form a space for conveying means, upper and lower sprockets supported from the tractor and located in front of the front end of the inner plate, a vertically arranged shaft supported from the frame and placed between the inner plate and the tractor, sprockets on said shaft, endless chains passing over the sprockets of the two sets and having outwardly extending fingers thereon, the inner plate having longitudinally extending slots in its front portion through which the fingers pass, and means for rotating the shaft from a part of the tractor and a horizontally arranged housing extending outwardly from the lower part of the outer plate adjacent the lower end of the shaft for receiving cutting means.

RAYMOND H. LINDHOLM.